(12) United States Patent
Gu et al.

(10) Patent No.: US 12,172,384 B2
(45) Date of Patent: Dec. 24, 2024

(54) OPTICAL WHEEL ASSEMBLY FOR A LASER TRANSMISSION WELDING APPARATUS

(71) Applicant: Magna International Inc., Aurora (CA)

(72) Inventors: Hongping Gu, Newmarket (CA); Aldo Van Gelder, Newmarket (CA)

(73) Assignee: Magna International Inc.

( * ) Notice: Subject to any disclaimer, the term of this patent is extended or adjusted under 35 U.S.C. 154(b) by 435 days.

(21) Appl. No.: 17/610,982

(22) PCT Filed: Jun. 17, 2020

(86) PCT No.: PCT/CA2020/050835
§ 371 (c)(1),
(2) Date: Nov. 12, 2021

(87) PCT Pub. No.: WO2020/252572
PCT Pub. Date: Dec. 24, 2020

(65) Prior Publication Data
US 2022/0227063 A1    Jul. 21, 2022

Related U.S. Application Data

(60) Provisional application No. 62/862,205, filed on Jun. 17, 2019.

(51) Int. Cl.
*B29C 65/14* (2006.01)
*B23K 26/06* (2014.01)
*B23K 26/142* (2014.01)

(52) U.S. Cl.
CPC ...... *B29C 65/1435* (2013.01); *B23K 26/0648* (2013.01); *B23K 26/0652* (2013.01); *B23K 26/142* (2015.10)

(58) Field of Classification Search
CPC ............ B29C 65/1435; B29C 65/1635; B23K 26/142; B23K 26/0648; B23K 26/0652
See application file for complete search history.

(56) References Cited

U.S. PATENT DOCUMENTS 4,237,363 A * 12/1980 Lemelson ........... B29C 66/8221
228/264
5,049,720 A    9/1991 Fang et al.
(Continued)

FOREIGN PATENT DOCUMENTS

CN      201151190       11/2008
CN      102079135 A     6/2011
(Continued)

OTHER PUBLICATIONS

J.P. Coelho, High-speed laser welding of plastic films, Optics and Lasers in Engineering 34 (2000) 385}395 (Year: 2000).*
(Continued)

*Primary Examiner* — Cedrick S Williams
*Assistant Examiner* — Erica Hartsell Funk
(74) *Attorney, Agent, or Firm* — Aventum IP Law LLP

(57) ABSTRACT

An optical wheel assembly for a laser transmission welding apparatus includes a double-convex optical lens having two spherical surfaces that are joined by a polished side surface extending circumferentially around the lens. Each of the two spherical surfaces has a known spherical diameter. The optical lens is disposed between a pair of dish cup holders, each having a spherical concave surface with the known spherical diameter and engaging the spherical surfaces of the lens. Each dish cup holder has an axial projection extending away from a side of the dish cup holder that is opposite the spherical concave surface. The axial projections are received within respective bearings that are mounted within a housing. The bearings allow the dish cup holders and the optical (Continued)

lens to rotate while pressure is being applied to plastic workpieces during laser transmission welding thereof.

21 Claims, 5 Drawing Sheets

(56) References Cited

U.S. PATENT DOCUMENTS

| | | | |
|---|---|---|---|
| 5,120,926 A | 6/1992 | Marriott | |
| 6,172,323 B1 | 1/2001 | Ishide et al. | |
| 6,966,968 B2 | 11/2005 | Chen et al. | |
| 7,211,166 B2 | 5/2007 | Chen et al. | |
| 7,223,315 B2 | 5/2007 | Chen | |
| 7,785,687 B2 | 8/2010 | Ando | |
| 7,960,003 B2 | 6/2011 | Kihara et al. | |
| 8,075,725 B2 | 12/2011 | Hofmann et al. | |
| 8,084,709 B2 | 12/2011 | Scheidt et al. | |
| 8,413,701 B2 | 4/2013 | Lee et al. | |
| 9,180,612 B2 | 11/2015 | Kerbiguet et al. | |
| 9,393,738 B2 | 7/2016 | Kugelmann et al. | |
| 9,878,490 B2 | 1/2018 | Butzke et al. | |
| 10,286,608 B2 | 5/2019 | Watanabe et al. | |
| 2005/0039855 A1 | 2/2005 | Chen et al. | |
| 2005/0218123 A1 | 10/2005 | Hayakawa et al. | |
| 2006/0060304 A1 | 3/2006 | Chen et al. | |
| 2009/0001054 A1 | 1/2009 | Mizuno et al. | |
| 2009/0294047 A1 | 12/2009 | Kurosaki et al. | |
| 2011/0100963 A1* | 5/2011 | Mangols | B29C 66/652 219/121.63 |
| 2011/0200791 A1 | 8/2011 | Kugelmann et al. | |
| 2014/0283987 A1 | 9/2014 | Contractor et al. | |
| 2014/0373999 A1* | 12/2014 | Hutchinson De Staercke | B32B 37/10 156/62.2 |
| 2018/0021887 A1* | 1/2018 | Liu | B23K 26/342 219/121.75 |
| 2018/0111319 A1* | 4/2018 | Brezoczky | B29C 64/255 |
| 2018/0111327 A1 | 4/2018 | Watanabe et al. | |
| 2021/0268601 A1 | 9/2021 | Gubler | |

FOREIGN PATENT DOCUMENTS

| | | |
|---|---|---|
| CN | 102107530 A | 6/2011 |
| CN | 101486255 | 1/2012 |
| CN | 101486255 B | 1/2012 |
| CN | 202480377 U | 10/2012 |
| CN | 102909858 A | 2/2013 |
| CN | 203818576 | 9/2014 |
| CN | 204382658 | 6/2015 |
| CN | 102909859 B | 4/2016 |
| CN | 103935044 A | 1/2017 |
| CN | 107584770 A | 1/2018 |
| CN | 108943739 A | 12/2018 |
| CN | 109228368 A | 1/2019 |
| CN | 109848591 | 6/2019 |
| CN | 208993119 U | 6/2019 |
| CN | 110077000 | 8/2019 |
| CN | 102672350 | 9/2019 |
| CN | 110625949 A | 12/2019 |
| CN | 209716802 | 12/2019 |
| CN | 110814518 A | 2/2020 |
| CN | 210100741 | 2/2020 |
| CN | 108819292 A | 9/2020 |
| CN | 108724739 B | 10/2020 |
| DE | 4319742 | 12/1994 |
| DE | 102009043376 A | 4/2011 |
| EP | 1060837 A3 | 11/2001 |
| EP | 1405713 B1 | 4/2004 |
| EP | 1440784 A1 | 7/2004 |
| EP | 1987944 | 11/2008 |
| EP | 2116355 B1 | 11/2009 |
| EP | 2607056 A1 | 6/2013 |
| EP | 2321115 B1 | 4/2014 |
| EP | 2087989 B1 | 7/2017 |
| EP | 2566683 B1 | 10/2017 |
| FR | 2952316 A1 | 5/2011 |
| FR | 2983768 | 11/2014 |
| JP | 9070680 | 7/1982 |
| JP | S58163587 A | 9/1983 |
| JP | 61102238 A | 5/1986 |
| JP | 9327781 | 12/1997 |
| JP | 2002248688 A | 9/2002 |
| JP | 2003123506 | 4/2003 |
| JP | 2004114437 A | 4/2004 |
| JP | 2004349123 A | 12/2004 |
| JP | 201566750 A | 9/2010 |
| JP | 5305003 B2 * | 10/2013 |
| JP | 20055081396 A2 | 3/2015 |
| JP | 2016083853 | 5/2016 |
| JP | 2018202861 A5 | 5/2019 |
| JP | 2017042774 A | 2/2020 |
| KR | 100986074 B1 | 3/2010 |
| KR | 20100029975 | 3/2010 |
| KR | 100990928 B1 | 11/2010 |
| WO | 2012080082 | 6/2012 |
| WO | 2019016172 A | 1/2019 |
| WO | 2019088058 A1 | 5/2019 |

OTHER PUBLICATIONS

Sugiyama translation accessed on ESpaceNet Jun. 26, 2024 (Year: 2013).*

* cited by examiner

OPTICAL WHEEL ASSEMBLY FOR A LASER TRANSMISSION WELDING APPARATUS

FIELD OF THE INVENTION

The present disclosure relates generally to apparatuses and methods for laser transmission welding of workpieces made from plastic. More particularly, the present disclosure relates to an optical wheel assembly for a laser transmission welding apparatus.

BACKGROUND

Methods for joining together plastic workpieces with the aid of a laser beam are known and referred to as transmission welding. The plastic workpieces are held together by a clamping force in the region that is to be joined while the laser beam is moved relative to the workpieces. The laser beam passes through a first (e.g., top) workpiece, which is transparent to the laser radiation, and is absorbed at a surface of a second (e.g., bottom) workpiece that is in contact with the first workpiece. Heat is generated at the surface of the second workpiece when the laser radiation is absorbed, and some of this generated heat is transferred to the first workpiece. The heating causes the material at the surfaces of the first and second workpieces to melt, and when an adequate clamping force is applied, the gap between the two workpieces is sufficiently small to permit intermingling of the melted materials. A reliable bond is formed upon cooling and solidification of the material in the joined region.

As will be apparent it is important that the workpieces are clamped to one another during the welding operation, since a key requirement for a good welded joint of the plastics by means of laser radiation is not only the energy dosing, but also the clean and mechanical contact between the two joint surfaces to be connected to one another. Various methods and devices which permit an adequate contact pressure are known for the purpose, however this requirement is difficult to achieve consistently for large sized molded parts under normal welding conditions.

It would be beneficial to provide methods and apparatuses that overcome at least some of the above-mentioned disadvantages and/or limitations.

SUMMARY OF THE INVENTION

In accordance with an aspect of at least one embodiment there is provided an optical wheel assembly for a laser transmission welding apparatus, including: a housing; a double-convex optical lens having two spherical surfaces that are joined by a polished side surface extending circumferentially around the lens, each of the two spherical surfaces having a known spherical diameter; a pair of dish cup holders, each having a spherical concave surface with the known spherical diameter, the double-convex optical lens being disposed between the pair of dish cup holders such that each of the two spherical surfaces of the double-convex optical lens engages the spherical surface of a respective dish cup holder of the pair of dish cup holders, each dish cup holder having an axial projection extending away from a side of the dish cup holder that is opposite the spherical concave surface thereof; and a pair of bearing assemblies mounted to the housing, and each bearing assembly being disposed for receiving the axial projection extending from a respective dish cup holder of the pair of dish cup holders.

In an embodiment, the two spherical surfaces of the double-convex optical lens are unpolished spherical surfaces.

In an embodiment, the two spherical surfaces of the double-convex optical lens are polished spherical surfaces.

In accordance with an aspect of at least one embodiment there is provided a optical wheel assembly for a laser transmission welding apparatus, including: an optical wheel having two convex side surfaces that are joined by a polished working surface, the polished working surface extending circumferentially around the optical wheel; a pair of dish cup holders each having a supporting portion with a concave surface that is complementary to a shape of a respective one of the two convex side surfaces of the optical wheel, the optical wheel being disposed between the pair of dish cup holders such that the two convex side surfaces of the optical wheel engage the concave surface of a respective dish cup holder of the pair of dish cup holders, each dish cup holder having an axle portion extending away from a side of the dish cup holder that is opposite the concave surface thereof; and a bearing assembly comprising a pair of bearings, each bearing of the pair of bearings being disposed for receiving the axle portion of a respective dish cup holder of the pair of dish cup holders.

In an embodiment, the two convex side surfaces of the optical wheel are unpolished convex side surfaces.

In an embodiment, the two convex side surfaces of the optical wheel are polished convex side surfaces.

In accordance with an aspect of at least one embodiment there is provided a laser transmission welding apparatus, including: a laser source for providing laser light for welding together a first plastic workpiece and a second plastic workpiece; a support surface for supporting the first plastic workpiece and the second plastic workpiece in an at least partially overlapping relationship one with the other; an optical wheel assembly disposed between the laser source and the support surface, and including: a housing; an optical wheel having two convex side surfaces that are joined by a polished working surface, the polished working surface extending circumferentially around the optical wheel; a pair of dish cup holders each having a supporting portion with a concave surface that is complementary to a shape of a respective one of the two convex side surfaces of the optical wheel, the optical wheel being disposed between the pair of dish cup holders such that the two convex side surfaces of the optical wheel engage the concave surface of a respective dish cup holder of the pair of dish cup holders, each dish cup holder having an axle portion extending away from a side of the dish cup holder that is opposite the concave surface thereof; and a bearing assembly comprising a pair of bearings mounted to the housing, each bearing of the pair of bearings being disposed for receiving the axle portion of a respective dish cup holder of the pair of dish cup holders and for applying a biasing force to the respective dish cup holder of the pair of dish cup holders along a respective direction toward the optical lens wheel; wherein during use the laser light from the laser source impinges on the working surface of the optical wheel and is transmitted through the optical wheel to a desired weld region within an overlapping portion of the first and second workpieces, and wherein during use the working surface presses on the overlapping region to supply a clamping force during forming the weld.

In an embodiment, the two convex side surfaces of the optical wheel are unpolished convex side surfaces.

In an embodiment, the two convex side surfaces of the optical wheel are polished convex side surfaces.

BRIEF DESCRIPTION OF THE DRAWINGS

Embodiments will now be described by way of example only, and with reference to the attached drawings, wherein similar reference numerals denote similar elements throughout the several views, and in which.

DETAILED DESCRIPTION OF THE DRAWINGS

The following description is presented to enable a person skilled in the art to make and use the invention and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed but is to be accorded the widest scope consistent with the principles and features disclosed herein.

Figure 1:
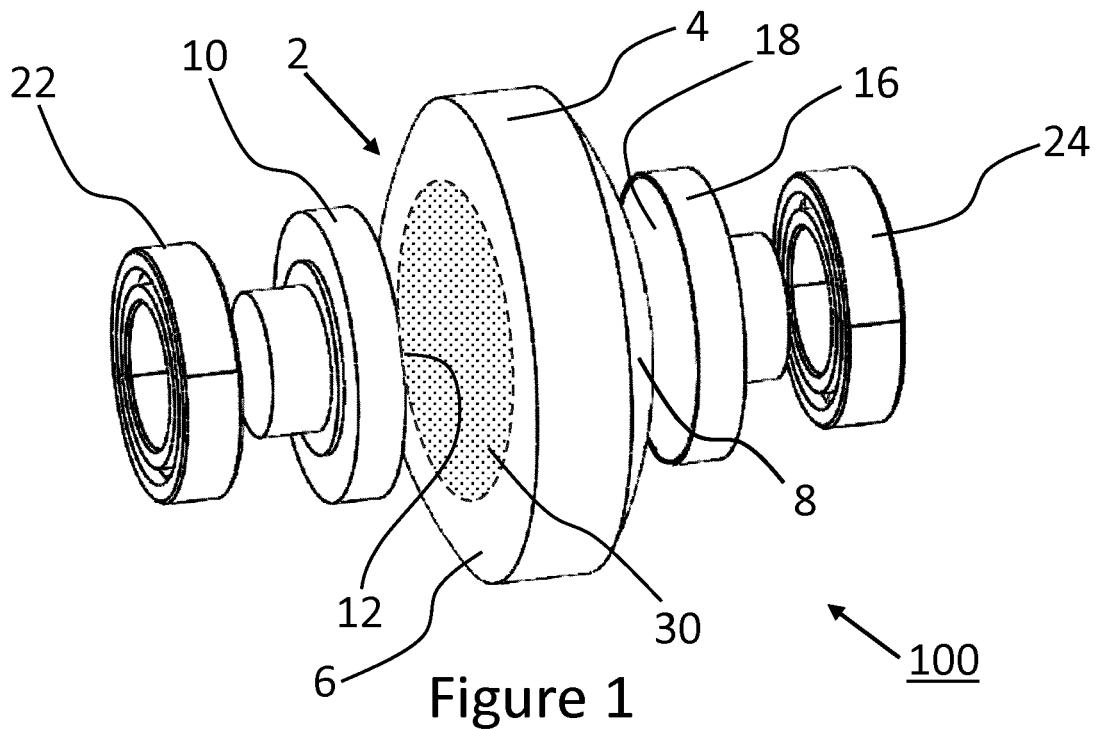
FIG. 1 is an exploded view of an optical wheel assembly for a laser transmission welding apparatus according to an embodiment.

Referring to FIG. 1, shown is an exploded view of an optical wheel assembly 100 for a laser transmission welding apparatus according to an embodiment. An optical wheel 2 in the form of a double-convex optical lens comprises a polished, circumferential working surface 4 and first and second spherical surfaces 6 and 8. For instance, the first and second spherical surfaces 6 and 8 may be unpolished surfaces. In general terms, the surface roughness of the first and second spherical surfaces 6 and 8 is greater than that of the working surface 4. Optionally, a non-slip material is coated onto at least a central portion of the first and second spherical surfaces 6 and 8. The optical wheel 2 may be fabricated from a suitable material that is transparent to the wavelength of light used during the laser transmission welding operation, such as optical glass or optical plastic. Some specific and non-limiting examples of suitable materials include fused silica, N-BK7 and laser transparent plastics, etc. In addition, the hardness of the material used to fabricate the optical wheel 2 may be tailored to suit specific welding applications. For instance, softer or non-marking materials may be used for welding components that will be visible in a finished product, whereas harder materials may be used for applications that require higher applied pressures and/or that produce components that are not visible in a finished product. Of course, the material selected for a particular application must also satisfy the requirement of being laser transparent within the wavelength of light being used.

The optical wheel assembly 100 further includes a first dish cup holder 10 having a supporting portion with a concave surface 12 and an axle portion, and a second dish cup holder 16 having a supporting portion with a concave surface 18 and an axle portion. The first and second dish cup holders are arranged such that the concave surfaces 12 and 18 face one another, with the optical wheel 2 being disposed therebetween. The axle portions (i.e., axial projections) extend away from a side of the respective supporting portion that is opposite the spherical concave surface 12 or 18 thereof.

The first dish cup holder 10 and the second dish cup holder 16 are each fabricated from a suitable material, which does not deform under normal operating conditions. Additionally, the material is capable of "gripping" the surfaces 6 and 8 sufficiently so as to substantially prevent movement of the optical wheel 2 relative to the first and second dish cup holders 10 and 16 when the optical wheel assembly is being used to apply pressure to the plastic workpieces that are undergoing laser transmission welding. For instance, the first and second dish cup holders 10 and 16 may be fabricated from a metal or a metal alloy. Some specific and non-limiting examples of suitable materials include aluminium, copper or steel. Advantageously, such metals have good heat conductivity properties and help to prevent a buildup of heat in the optical wheel 2. Alternatively, the first and second dish cup holders 10 and 16 may be fabricated from a non-metallic material, such as for instance a ceramic material. Preferably the non-metallic material is a good heat conductor.

Figure 2:
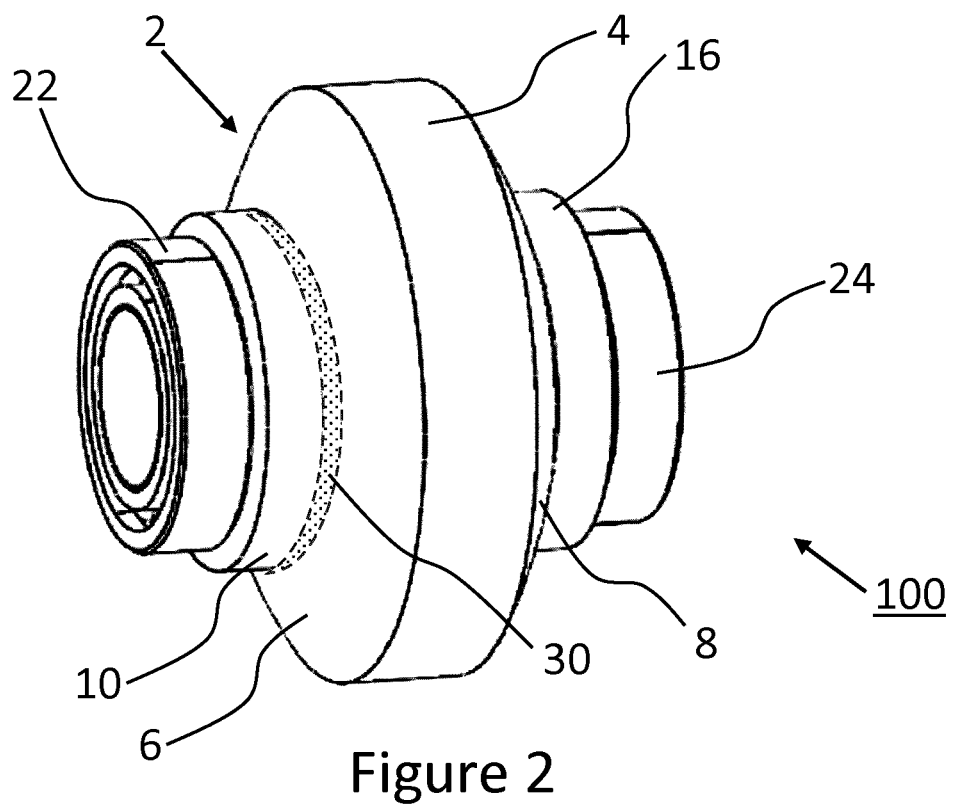
FIG. 2 is a perspective view of the optical wheel assembly of FIG. 1 in an assembled condition.

Now referring also to FIG. 2, the optical wheel assembly 100 is shown in an assembled condition. Concave surface 12 of the first dish cup holder 10 frictionally engages the first spherical surface 6 of the optical wheel 2, and concave surface 18 of the second dish cup holder 16 frictionally engages the second spherical surface 8 of the optical wheel 2, thereby supporting the optical wheel 2 therebetween. In some embodiments the first and second spherical surfaces 6 and 8 are unpolished, having a surface roughness greater than that of the polished circumferential working surface 4, which helps to prevent slippage relative to the concave surfaces 12 and 18 and provides for a more cost effective way of manufacturing the optical wheel. In some embodiments the first and second spherical surfaces 6 and 8 are also polished, although the laser beam is not transmitted through the first and second spherical surfaces 6 and 8. If the first and second spherical surfaces 6 and 8 include an optional coating of a non-slip material 30, then the concave surfaces 12 and 18 preferably overlap and engage the coating of the non-slip material 30.

The axle portions of the first and second dish cup holders are received within first and second bearings 22 and 24, respectively, which rotatably support the optical wheel 2 relative to a (not-illustrated) housing of the laser transmission welding apparatus.

Figure 3:
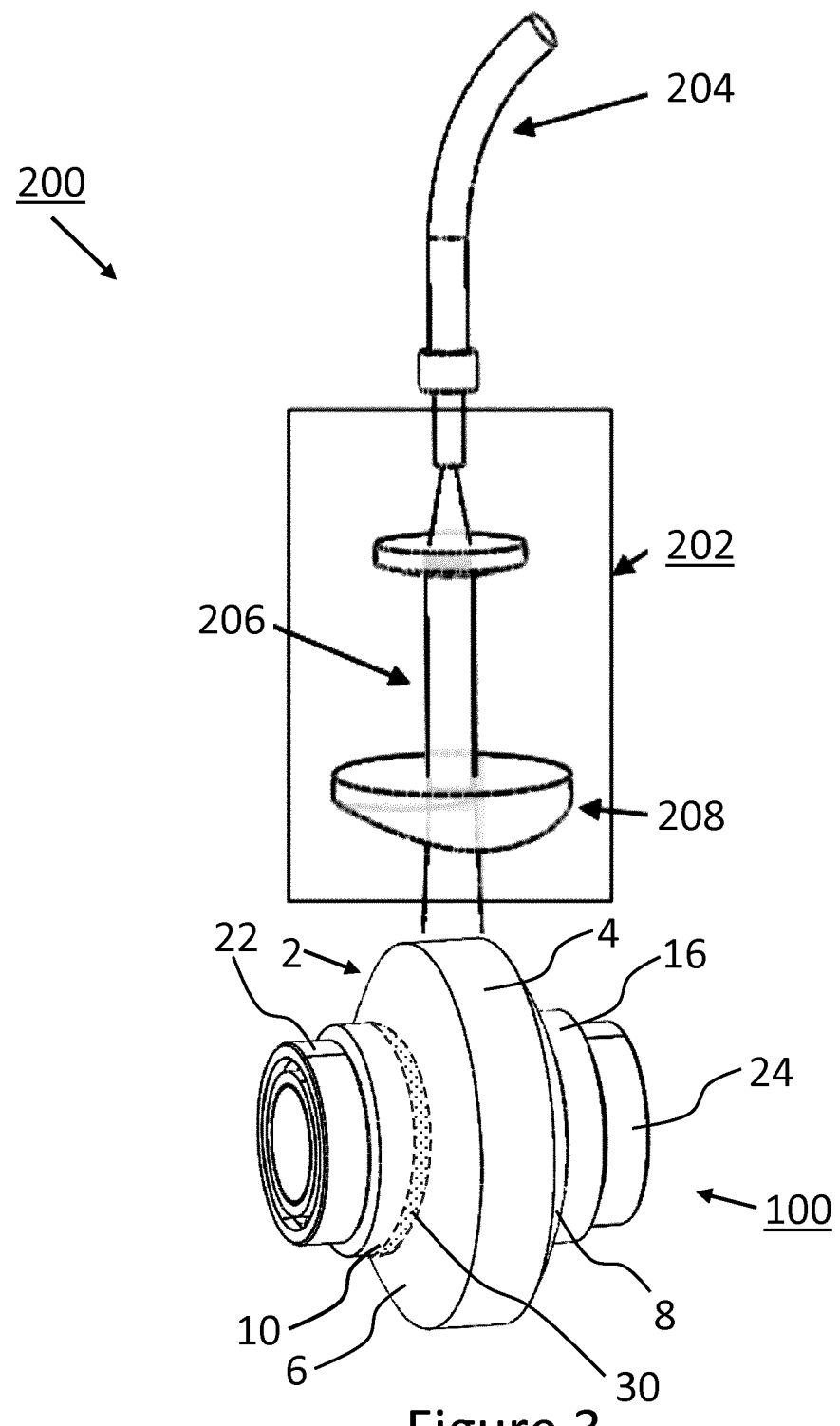
FIG. 3 is a simplified diagram showing the major systems of a laser transmission welding apparatus including the optical wheel assembly of FIG. 1.

FIG. 3 is a simplified diagram showing the major systems of a laser transmission welding apparatus 200. In particular, the apparatus 200 includes beam shaping optics shown generally at 202, which receive laser light from e.g. optical fiber 204 and forms a collimated beam 206. The collimated beam 206 is directed toward the working surface 4 of the optical wheel 2 via e.g. a Plano-Concave (PCV) cylinder lens or a Powell lens 208 of the beam shaping optics 202. The beam shaping optics 202 account for the focusing effect of the optical wheel. In this way, the width of the laser beam spot along the welding direction can be optimized for the process. Of course, the beam shaping optics shown generally at 202 and the optical fiber 204 are well known in the art of laser transmission welding and therefore will not be discussed in detail herein.

During laser transmission welding the optical wheel 2 serves at least two purposes. Firstly, it acts as an optical component to transmit the laser light to the plane of the laser weld, which lies between the plastic workpieces that are being welded together. Secondly, the optical wheel 2 applies pressure to the surface of one the plastic workpieces, so as to provide the clamping force that is required to minimize the gap between the plastic workpieces and thereby enable the formation of a high-quality weld. This second purpose of the optical wheel 2 creates a problem since it is necessary to support the optical wheel in a manner that allows it to rotate freely i.e., to roll along the surface of one of the workpieces that is being welded together whilst also being held securely enough to avoid slippage of the optical wheel within its support structure during application of pressure to the workpiece. Of course, the use of an axle and bearing that extend through the center of the optical wheel is precluded due to the need to transmit the laser light directly through the center of the optical wheel. The optical wheel assembly addresses this problem, as discussed in more detail below.

Figure 4:
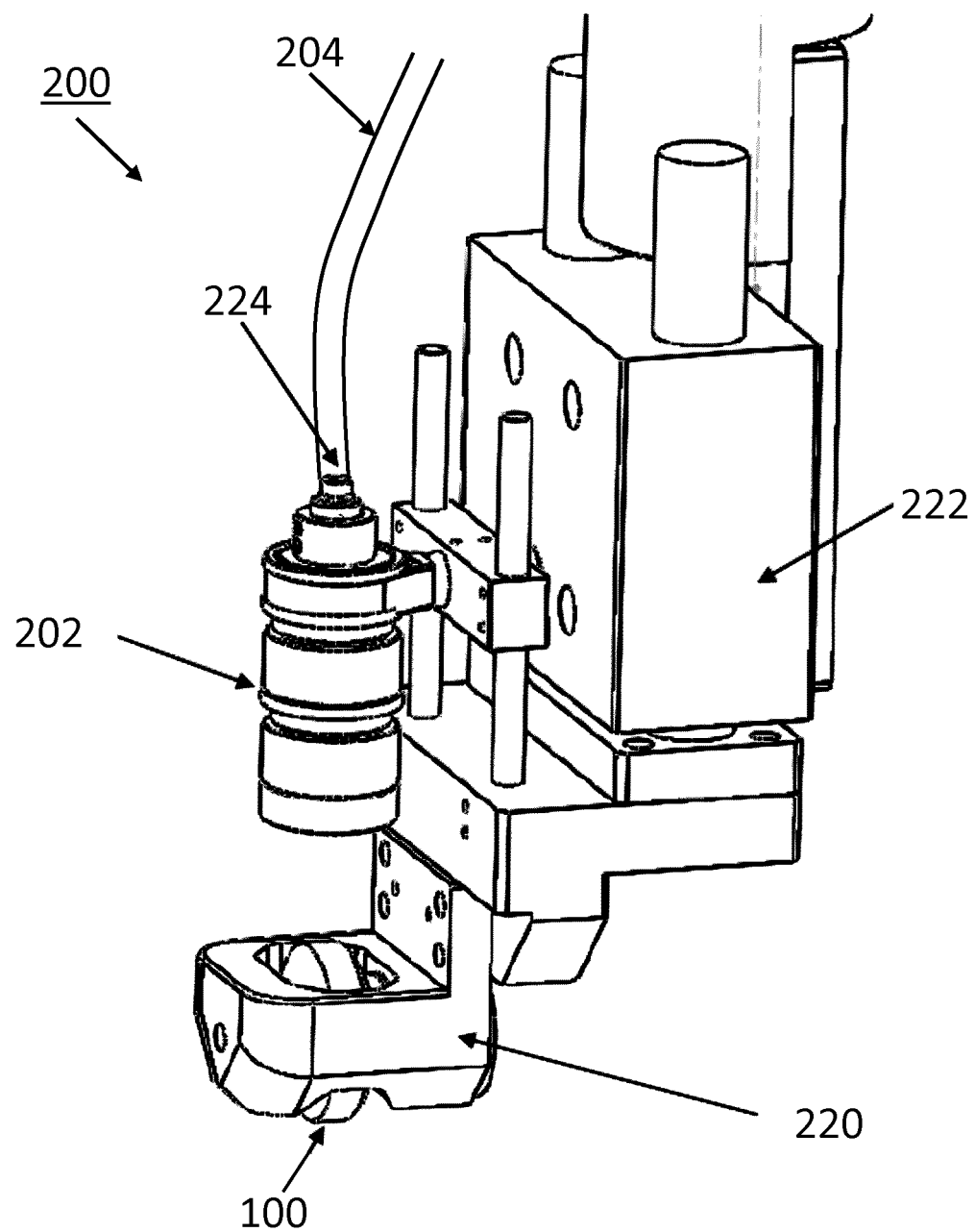
FIG. 4 is a simplified perspective view of a laser transmission welding apparatus including the optical wheel assembly of FIG. 1.

Referring now to FIG. 4, the optical wheel assembly 100 is shown mounted in a housing 220 of the laser transmission welding apparatus 200. The housing 220 is supported on cylinder 222, such as for instance a pneumatic or hydraulic cylinder, which provides an active pressing force during operation and allows for geometrical variation along the welding path. The beam shaping optics 202 are also supported on cylinder 222, with optical fiber 204 being coupled to the laser beam inlet 224 thereof.

During use, the laser beam that impinges on the optical wheel 2 should fit entirely within the width of the polished working surface 4. For certainty, the width of the working surface 4 is measured along a direction that is parallel to the central axis about which the optical wheel 2 rotates. As such, the optical wheel 2 may be fabricated with a desired width in order to accommodate different laser beam spot sizes for different laser welding applications. For instance, a relatively wider working surface 4 may be provided on the optical wheel 2 for forming relatively wider welds and a relatively narrower working surface 4 may be provided on the optical wheel 2 for forming relatively narrower welds. The laser transmission welding apparatus 200 may be manufactured for performing a single laser welding application, such that a different apparatus 200 must be purchased for each different laser welding application. Alternatively, the laser transmission welding apparatus 200 may be manufactured to accommodate different optical wheels 2 having working surface widths within a known range. In this case, the optical wheels 2 may be swapped out when a different working surface width is required to perform a desired welding process. Non-limiting ways of accommodating optical wheels having different widths includes using dish cup holders 10, 16 having different length axial projections to support optical wheels of different widths within the housing 220 or providing a mechanism for adjusting the housing 220 to receive and support the optical wheels having different widths. As will be apparent, the optical wheel 2 and/or other components of the laser transmission welding apparatus 200 can be custom designed or tailored to suit different applications.

Figure 5:
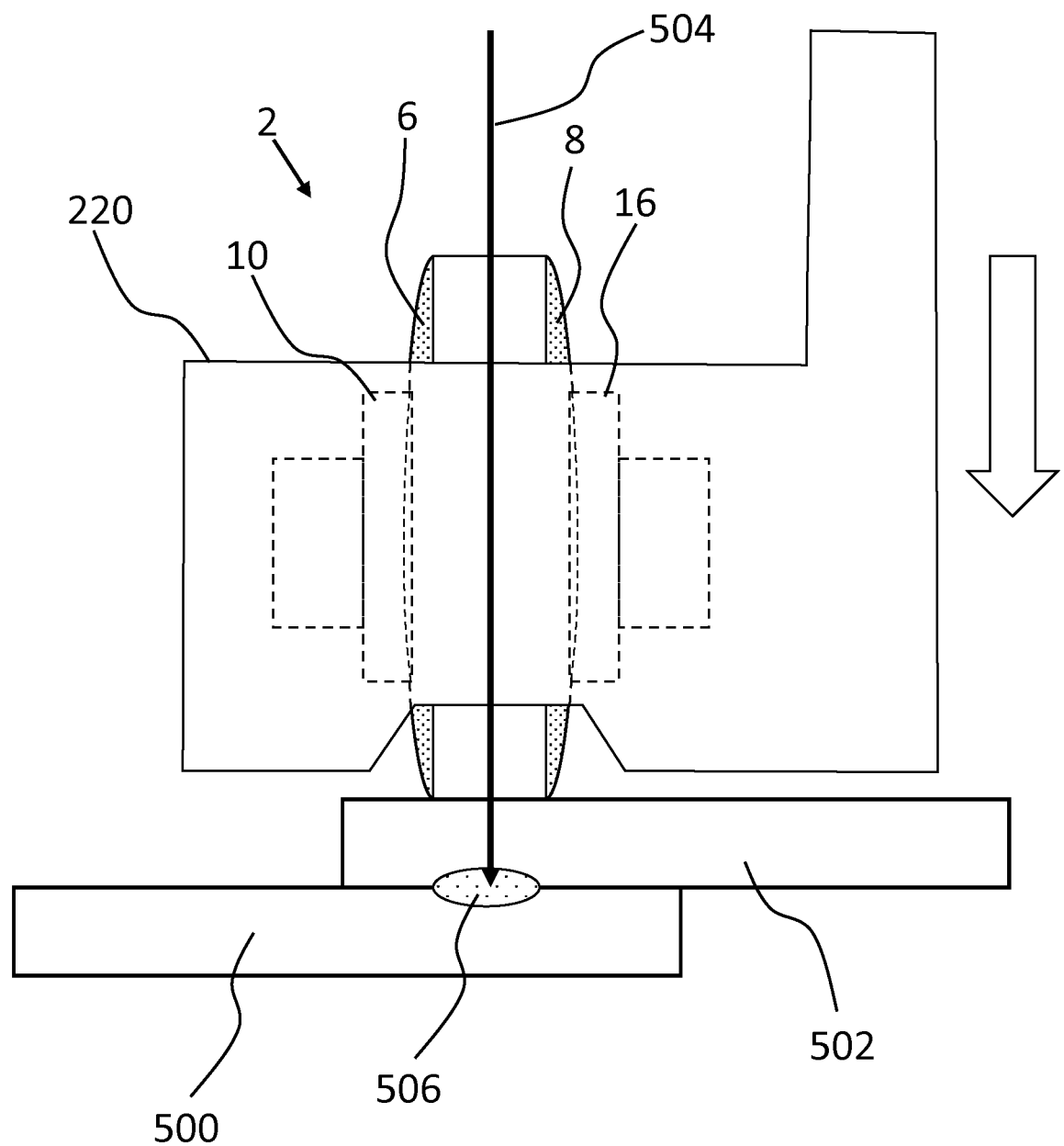
FIG. 5 is a simplified diagram showing operation of a laser transmission welding apparatus that includes the optical wheel assembly of FIG. 1 during the welding together of two plastic workpieces.

FIG. 5 illustrates the operation of a laser transmission welding apparatus that includes the optical wheel assembly 100, during the welding together of two plastic workpieces. As is shown in FIG. 5 the two workpieces 500 and 502 are overlapped along edges thereof in preparation to form a lap weld. Workpiece 502 is transparent to the laser light 504 and at least the surface of the workpiece 500 absorbs the laser light 504. Heat generated by the absorption of laser light 504 melts a portion of the surface of workpiece 500 and is partially transferred to and melts a portion of the workpiece 502. Material from workpiece 500 and 502 intermingle to form a weld pool 506 between the two workpieces. A pressing force, represented by the block arrow in FIG. 5, is applied to the workpiece 502 via the optical wheel 100, thereby forcing together the workpieces 500 and 502 at the weld spot, which is directly below the optical wheel 100 in FIG. 5. The optical wheel is advanced along a welding direction (not shown) and continues to apply the pressing force to the workpiece 500 as the laser transmission welding process proceeds.

Advantageously the supporting portions of the first and second dish cup holders 10 and 16 have concave spherical surfaces 12 and 18 that are shaped to receive the spherical surfaces 6 and 8, respectively, of the optical wheel 2. The complementary shapes of the various surfaces help to prevent movement of the optical wheel 2 relative to the housing along the direction of the applied force. In particular, the housing 220 is configured such that the first and second dish cup holders are pressed against the spherical surfaces 6 and 8 of the optical wheel by forces directed normal to the direction of the block arrow in FIG. 5. Fabricating the dish cup holders 10 and 16 from a material that does not deform under normal operating conditions, such as for instance aluminium, copper or steel, in combination with the unpolished or non-slip coated nature of the spherical surfaces 6 and 8, in at least some embodiments, ensures that movement of the optical wheel 2 relative to the dish cup holders does not occur under normal operating conditions of applied pressure.

Figure 6:
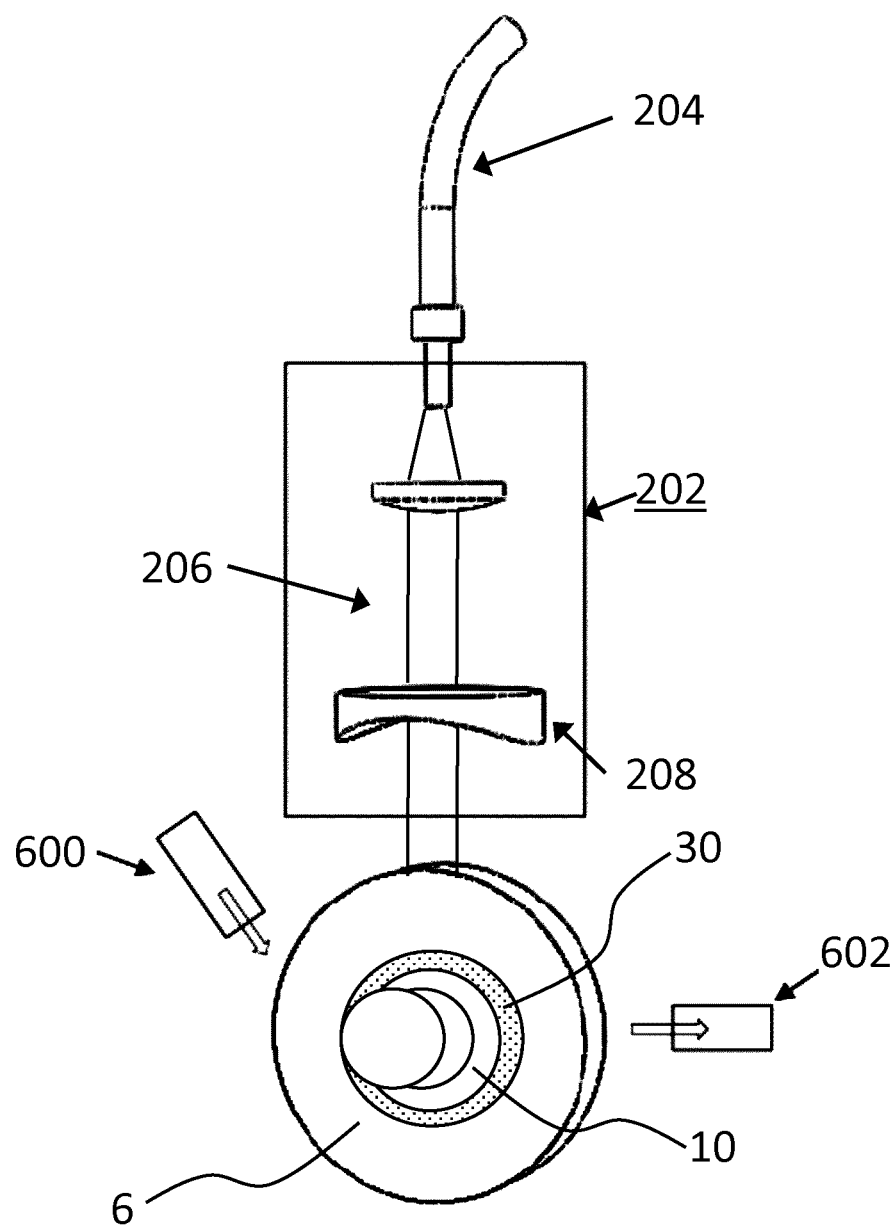
FIG. 6 is a simplified diagram showing the major systems of a laser transmission welding apparatus including an air knife and optical sensor for cleaning a working surface of the optical wheel.

Referring now to FIG. 6, shown is a simplified diagram illustrating the major systems of a laser transmission welding apparatus including an air knife 600 and an optical sensor 602 for cleaning a working surface, i.e. the polished, circumferential working surface 4 of the optical wheel 2 of the optical wheel assembly 100. Since the optical wheel serves the dual purpose of applying a pressing force and transmitting laser light to the desired weld region, the working surface 4 is susceptible to becoming fouled due to the deposition of material from the workpieces and/or from environmental contaminants. If the working surface is not clean, then laser light is not transmitted efficiently, and furthermore the workpieces may be imprinted by any material that has built up on the working surface. The air knife 600 may be used to provide clean the working surface 4 and the optical sensor may be used to inspect the working surface 4. The cleaning may be implemented in various ways. For instance, the optical sensor 602 may continuously or intermittently sense the working surface 4 of the optical wheel 2 and trigger operation of the air knife 600 when the sensed signal is outside a predetermined threshold. Alternatively, the air knife 600 may continuously or intermittently clean the working surface 4 of the optical wheel 2 until a signal sensed by the optical sensor 602 is indicative of a clean working surface 4.

In the description herein, it is understood that a word appearing in the singular encompasses its plural counterpart, and a word appearing in the plural encompasses its singular counterpart, unless implicitly or explicitly understood or stated otherwise. For instance, unless the context indicates otherwise, a singular reference, such as "a" or "an" means "one or more". Furthermore, it is understood that for any given component or embodiment described herein, any of the possible candidates or alternatives listed for that component may generally be used individually or in combination with one another, unless implicitly or explicitly understood or stated otherwise. Additionally, it will be understood that any list of such candidates or alternatives is merely illustrative, not limiting, unless implicitly or explicitly understood or stated otherwise. It is also to be understood, where appropriate, like reference numerals may refer to corresponding parts throughout the several views of the drawings for simplicity of understanding.

Throughout the description and claims of this specification, the words "comprise", "including", "having" and "contain" and variations of the words, for example "comprising" and "comprises" etc., mean "including but not limited to", and are not intended to (and do not) exclude other components.

It will be appreciated that variations to the foregoing embodiments can be made while still falling within the scope of the appended claims. Each feature disclosed in this specification, unless stated otherwise, may be replaced by alternative features serving the same, equivalent or similar purpose. Thus, unless stated otherwise, each feature disclosed is one example only of a generic series of equivalent or similar features.

The use of any and all examples, or exemplary language ("for instance", "such as", "for example", "e.g." and like language) provided herein, is intended merely to better illustrate the invention and does not indicate a limitation on the scope of the invention unless otherwise claimed. No language in the specification should be construed as indicating any non-claimed element as essential to the practice of the invention.

Any steps described in this specification may be performed in any order or simultaneously unless stated or the context requires otherwise.

All of the features disclosed in this specification may be combined in any combination, except combinations where at least some of such features and/or steps are mutually exclusive. In particular, the preferred features of the invention are applicable to all aspects of the invention and may be used in any combination. Likewise, features described in non-essential combinations may be used separately (not in combination).

What is claimed is:

1. An optical wheel assembly for a laser transmission welding apparatus, comprising:
    a housing;
    a double-convex optical lens having two spherical surfaces that are joined by a polished side surface extending circumferentially around the double-convex optical lens and defining a working surface, each of the two spherical surfaces having a known spherical diameter;
    a pair of dish cup holders, each having a spherical concave surface with the known spherical diameter, the double-convex optical lens being disposed between the pair of dish cup holders such that each of the two spherical surfaces of the double-convex optical lens frictionally engages the spherical concave surface of a respective dish cup holder of the pair of dish cup holders, each dish cup holder having an axial projection extending away from a side of the dish cup holder that is opposite the spherical concave surface thereof; and
    a pair of bearing assemblies mounted to the housing, and each bearing assembly being disposed for receiving the axial projection extending from a respective dish cup holder of the pair of dish cup holders,
    wherein during use laser light from a laser source impinges on the working surface of the double-convex optical lens and is transmitted through the double-convex optical lens to a desired weld region between overlapping first and second plastic workpieces to be welded together, and wherein during use the working surface presses the first and second plastic workpieces together to supply a clamping force during forming of a weld therebetween.

2. The optical wheel assembly for a laser transmission welding apparatus according to claim 1, wherein the two spherical surfaces of the double-convex optical lens are unpolished spherical surfaces.

3. The optical wheel assembly for a laser transmission welding apparatus according to claim 1, wherein a surface roughness of the two spherical surfaces of the double-convex optical lens is greater than a surface roughness of the polished side surface.

4. The optical wheel assembly for a laser transmission welding apparatus according to claim 1, wherein the two spherical surfaces of the double-convex optical lens are coated over at least a portion thereof by a non-slip material.

5. The optical wheel assembly for a laser transmission welding apparatus according to claim 1, wherein each dish cup holder of the pair of dish cup holders is fabricated from a metal or a metal alloy.

6. The optical wheel assembly for a laser transmission welding apparatus according to claim 5, wherein each dish cup holder of the pair of dish cup holders is fabricated from at least one of aluminium, copper and steel, or an alloy thereof.

7. The optical wheel assembly for a laser transmission welding apparatus according to claim 1, wherein the housing is configured to apply a biasing force to each of the dish cup holders along a respective direction toward the double-convex optical lens.

8. An optical wheel assembly for a laser transmission welding apparatus, comprising:
    an optical wheel having two convex side surfaces that are joined by a polished working surface, the polished working surface extending circumferentially around the optical wheel;
    a pair of dish cup holders each having a supporting portion with a concave surface that is complementary to a shape of a respective one of the two convex side surfaces of the optical wheel, the optical wheel being disposed between the pair of dish cup holders such that the two convex side surfaces of the optical wheel frictionally engage the concave surface of a respective dish cup holder of the pair of dish cup holders, each dish cup holder having an axle portion extending away from a side of the dish cup holder that is opposite the concave surface thereof; and
    a bearing assembly comprising a pair of bearings, each bearing of the pair of bearings being disposed for receiving the axle portion of a respective dish cup holder of the pair of dish cup holders,
    wherein during use laser light from a laser source impinges on the working surface of the optical wheel and is transmitted through the optical wheel to a desired weld region between overlapping first and second plastic workpieces to be welded together, and wherein during use the working surface presses the first and second plastic workpieces together to supply a clamping force during forming of a weld therebetween.

9. The optical wheel assembly for a laser transmission welding apparatus according to claim 8, comprising a housing for supporting the pair of bearings of the bearing assembly.

10. The optical wheel assembly for a laser transmission welding apparatus according to claim 8, wherein the two convex side surfaces of the optical wheel are unpolished spherical surfaces.

11. The optical wheel assembly for a laser transmission welding apparatus according to claim 8, wherein a surface roughness of the two convex side surfaces of the optical wheel is greater than a surface roughness of the polished working surface.

12. The optical wheel assembly for a laser transmission welding apparatus according to claim 8, wherein the two convex side surfaces of the optical wheel are coated over at least a portion thereof by a non-slip material.

13. The optical wheel assembly for a laser transmission welding apparatus according to claim 8, wherein each dish cup holder of the pair of dish cup holders is fabricated from a metal or a metal alloy.

14. The optical wheel assembly for a laser transmission welding apparatus according to claim 9, wherein the housing is configured to apply a biasing force to each of the dish cup holders along a respective direction toward the optical wheel.

15. A laser transmission welding apparatus, comprising:
a laser source for providing laser light for welding together a first plastic workpiece and a second plastic workpiece;
a support surface for supporting the first plastic workpiece and the second plastic workpiece in an at least partially overlapping relationship one with the other;
an optical wheel assembly disposed between the laser source and the support surface, and comprising:
a housing;
an optical wheel having two convex side surfaces that are joined by a polished working surface, the polished working surface extending circumferentially around the optical wheel;
a pair of dish cup holders each having a supporting portion with a concave surface that is complementary to a shape of a respective one of the two convex side surfaces of the optical wheel, the optical wheel being disposed between the pair of dish cup holders such that the two convex side surfaces of the optical wheel frictionally engage the concave surface of a respective dish cup holder of the pair of dish cup holders, each dish cup holder having an axle portion extending away from a side of the dish cup holder that is opposite the concave surface thereof; and
a bearing assembly comprising a pair of bearings mounted to the housing, each bearing of the pair of bearings being disposed for receiving the axle portion of a respective dish cup holder of the pair of dish cup holders and for applying a biasing force to the respective dish cup holder of the pair of dish cup holders along a respective direction toward the optical wheel;
wherein during use the laser light from the laser source impinges on the working surface of the optical wheel and is transmitted through the optical wheel to a desired weld region within an overlapping portion of the first and second plastic workpieces, and wherein during use the working surface presses on the overlapping portion to supply a clamping force during forming the weld.

16. The laser transmission welding apparatus according to claim 15, comprising an air knife disposed proximate the optical wheel and configured for directing a jet of air onto the working surface for performing a cleaning the working surface.

17. The laser transmission welding apparatus according to claim 15, comprising an optical sensor disposed relative to the working surface of the optical wheel for sensing a build-up of material on the working surface.

18. The laser transmission welding apparatus according claim 15, wherein the two convex side surfaces of the optical wheel are unpolished spherical surfaces.

19. The laser transmission welding apparatus according to claim 15, wherein a surface roughness of the two convex side surfaces of the optical wheel is greater than a surface roughness of the polished working surface.

20. The laser transmission welding apparatus according to claim 15, wherein the two convex side surfaces of the optical wheel are coated over at least a portion thereof by a non-slip material.

21. The laser transmission welding apparatus according to claim 15, wherein each dish cup holder of the pair of dish cup holders is fabricated from a metal or a metal alloy.

* * * * *